United States Patent
Nuggehalli

(10) Patent No.: US 9,659,327 B2
(45) Date of Patent: May 23, 2017

(54) EXPENSE REPORT SYSTEM WITH RECEIPT IMAGE PROCESSING

(75) Inventor: Jayasimha Nuggehalli, Cupertino, CA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/410,170

(22) Filed: Mar. 1, 2012

(65) Prior Publication Data
US 2013/0232040 A1 Sep. 5, 2013

(51) Int. Cl.
G06Q 40/00 (2012.01)
G06Q 10/10 (2012.01)
G06K 9/20 (2006.01)
G06K 9/00 (2006.01)
G06K 9/03 (2006.01)

(52) U.S. Cl.
CPC ............. *G06Q 40/00* (2013.01); *G06K 9/00* (2013.01); *G06K 9/033* (2013.01); *G06K 9/20* (2013.01); *G06K 9/2054* (2013.01); *G06Q 10/10* (2013.01); *G06Q 10/105* (2013.01); *G06Q 40/12* (2013.12)

(58) Field of Classification Search
CPC ........ G06Q 40/12; G06Q 40/02; G06Q 10/00; G06Q 10/105; G06K 9/00; G06K 9/033; G06K 9/20; G06K 9/2054
See application file for complete search history.

(56) References Cited

U.S. PATENT DOCUMENTS 5,689,620 A * 11/1997 Kopec et al. .................. 706/12
5,910,988 A * 6/1999 Ballard ........................... 705/75
6,918,038 B1 7/2005 Smith et al.
6,991,158 B2 * 1/2006 Munte ........................ 235/379
7,069,240 B2 * 6/2006 Spero et al. ................... 705/30
(Continued)

FOREIGN PATENT DOCUMENTS

EP 1206 117 A2 5/2002
JP 2011/237840 A 11/2011
WO WO 2004/111896 A1 12/2004

OTHER PUBLICATIONS

U.S. Appl. No. 13/523,732, filed Jun. 14, 2012, Office Action, Mailing Date Jul. 1, 2013.
(Continued)

*Primary Examiner* — Asfand Sheikh
(74) *Attorney, Agent, or Firm* — Hickman Palermo Becker Bingham LLP

(57) ABSTRACT

A system and method for generating expense data for an expense report is disclosed. The method includes receiving receipt data that includes one or more data items pertaining to a transaction, where the one or more data items are obtained from characters optically recognized in receipt image data for the transaction, and the receipt data includes data indicating whether the transaction is a credit card transaction or a cash transaction. The method further includes, if the receipt data indicates the transaction is a credit card transaction, creating expense data for the expense report, where the expense data includes the receipt data and the receipt image data associated with the receipt data for the transaction, and the receipt data includes credit card data. If the transaction indicates the transaction is a personal credit card transaction, then the credit card data is personal credit card data.

15 Claims, 16 Drawing Sheets

(56) References Cited

U.S. PATENT DOCUMENTS

| | | | |
|---|---|---|---|
| 7,437,330 B1* | 10/2008 | Robinson et al. | 705/67 |
| 8,014,604 B2* | 9/2011 | Tzadok et al. | 382/177 |
| 8,131,798 B2 | 3/2012 | Mori | |
| 9,165,391 B2* | 10/2015 | Pandipati | G06Q 40/00 |
| 2004/0083134 A1 | 4/2004 | Spero et al. | |
| 2004/0103014 A1 | 5/2004 | Teegan | |
| 2005/0024681 A1 | 2/2005 | Tehrani et al. | |
| 2005/0222944 A1 | 10/2005 | Dodson, Jr. et al. | |
| 2006/0285746 A1* | 12/2006 | Yacoub | G06K 9/03 382/176 |
| 2007/0124803 A1 | 5/2007 | Taraz | |
| 2007/0143674 A1 | 6/2007 | Daos et al. | |
| 2008/0212901 A1* | 9/2008 | Castiglia et al. | 382/311 |
| 2009/0092318 A1* | 4/2009 | Berard | G06F 17/30011 382/176 |
| 2009/0119574 A1 | 5/2009 | Gitlin et al. | |
| 2009/0119601 A1 | 5/2009 | Adachi | |
| 2010/0082454 A1* | 4/2010 | Narayanaswami | G06Q 20/20 705/26.1 |
| 2010/0188419 A1* | 7/2010 | Ratnakar et al. | 345/619 |
| 2010/0299763 A1 | 11/2010 | Marcus et al. | |
| 2011/0280481 A1* | 11/2011 | Radakovic et al. | 382/177 |
| 2012/0047052 A1* | 2/2012 | Patel | 705/30 |
| 2012/0185368 A1* | 7/2012 | Schloter et al. | 705/30 |
| 2013/0085904 A1* | 4/2013 | Menon | G06Q 10/10 705/30 |
| 2013/0129218 A1* | 5/2013 | Barrett et al. | 382/182 |
| 2013/0201307 A1* | 8/2013 | Schloter | H04N 5/23229 348/61 |
| 2013/0230205 A1 | 9/2013 | Nuggehalli | |
| 2013/0230246 A1 | 9/2013 | Nuggehalli | |
| 2013/0232041 A1 | 9/2013 | Nuggehalli | |

OTHER PUBLICATIONS

Gutev, Stanislav, "Information Extraction from Images of Shopping Receipts", Master of Science of Informatics University of Edunburg, dated 2011, 54 pages.

European Patent Office, "Search Report" in application No. 13156695.2-1958, dated May 28, 2013, 8 pages.

U.S. Appl. No. 13/774,992, filed Feb. 22, 2013, Office Action, mailing date Mar. 2, 2015.

U.S. Appl. No. 13/774,992, filed Feb. 22, 2013, Notice of Allowance, Mailing Date Sep. 9, 2015.

U.S. Appl. No. 13/754,718, filed Jan. 30, 2013, Office Action, Mailing Date Oct. 2, 2015.

U.S. Appl. No. 13/774,992, filed Feb. 22, 2013, Final Office Action, mailing date Jun. 2, 2015.

U.S. Appl. No. 13/754,718, filed Jan. 30, 2013, Final Office Action, mailing date May 11, 2016.

European Patent Office, "Search Report" in application No. 13169739.3-1958, dated Nov. 27, 2013, 13 pages.

* cited by examiner

FIG. 14

EXPENSE REPORT SYSTEM WITH RECEIPT IMAGE PROCESSING

FIELD OF THE INVENTION

The present invention relates to a system and method for managing expense data for expense reports.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Currently, accounting for business expenditures is a painstaking and time-consuming activity. The receipts relating to an expenditure must be collected, itemized, and entered manually into a form. The receipt must then be reconciled with any credit card information available from a credit card service that processed a credit card used in the making the expenditure. If a person made the expenditure with a personal credit card, then a credit card statement for the expenditure must be collected from the person using the credit card. If the person made the expenditure with cash, then there is no credit card data with which to reconcile the receipt. Not only do the above activities take time, but they also delay reimbursement to the person making the expenditure.

SUMMARY

One embodiment of the present invention is a method for generating expense data for an expense report. The method includes receiving receipt data that includes one or more data items pertaining to a transaction, where the one or more data items are obtained from characters optically recognized in receipt image data for the transaction, and the receipt data includes data indicating that the transaction is a credit card transaction, and creating expense data for the expense report, where the expense data includes the receipt data and the receipt image data associated with the receipt data for the transaction, and the receipt data includes credit card data.

Another embodiment is a system for generating expense data for an expense report. The system includes an interface to a receipt image processing system and an expense data generator. The interface to a receipt image processing system receives receipt image data, optically recognizes characters in the receipt image data, and provides receipt data obtained from the recognized characters, where the receipt data includes one or more data items pertaining to a transaction and indicates whether the transaction is a credit card transaction or a cash transaction. The expense data generator receives receipt data, and creates expense data for the expense report, where the expense data includes the receipt data and the receipt image data associated with the receipt data for the transaction.

BRIEF DESCRIPTION OF THE DRAWINGS

In the drawings:

FIG. 14 is a depiction, in one embodiment, of expense data;

DETAILED DESCRIPTION

In the following description, for the purposes of explanation, numerous specific details are set forth in order to provide a thorough understanding. It will be apparent, however, that the present invention may be practiced without these specific details. In other instances, well-known structures and devices are depicted in block diagram form in order to avoid unnecessarily obscuring the present invention.

General Overview

An embodiment obtains data from a receipt and matches the data with credit card information, if the transaction recorded on the receipt is a credit card transaction. An expense report is generated based the receipt data and the credit card transaction data. In the description that follows, it is understood that while the term "credit card" is used for purposes of explanation, the term includes, without limitation any form of payment that involves the use of crediting or debiting of an account and is not limited to credit, debit, or ATM cards. For example, the approach is applicable to transactions involving the use of credit cards, debit cards and ATM cards, as well as transactions that are performed using wireless communications, for example, via mobile devices, PDAs, cell phones, tablet computers, laptop computers, etc.

Figure 1:
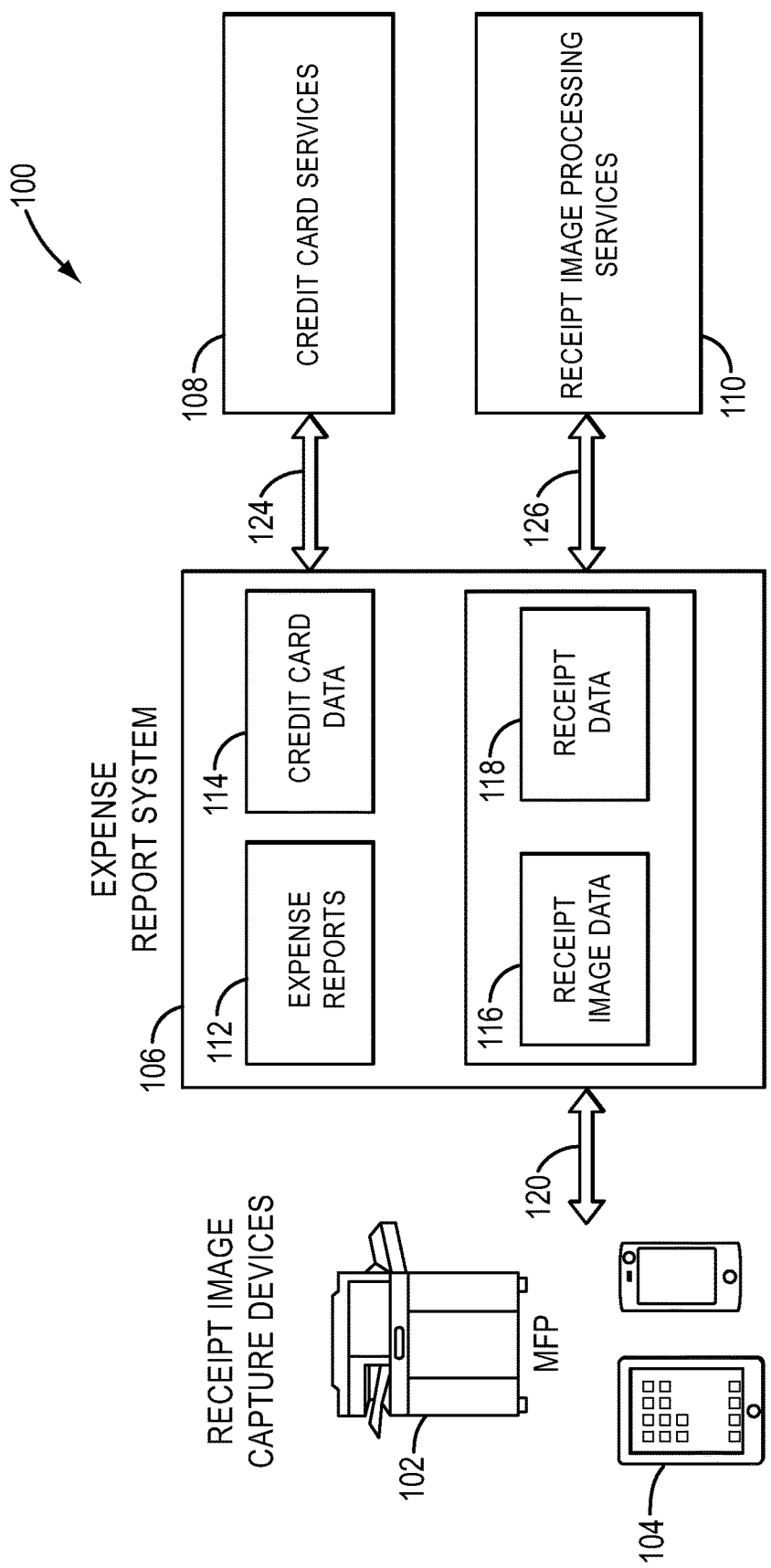
FIG. 1 depicts an overall system configuration according to one embodiment of the present invention.

FIG. 1 depicts a system configuration 100 according to an embodiment. The system configuration of FIG. 1 includes receipt image capture devices such as MFP 102 and mobile devices 104, an expense report system 106, credit card services 108, and receipt image processing services 110. The expense report system 106 includes expense reports 112, credit card data 114, receipt image data 116, which is the electronic version of the receipt image, and receipt data 118.

The expense report system 106 is connected to the receipt image capture devices 102, 104 via communications link 120, to the credit card services 108 via communications link 124, and to the receipt image processing services 110 via communications link 126. In one embodiment, link 120 is an Internet connection, link 124 is an Internet connection, and link 126 is an applications programming interface (API), such as an interface operating in accordance with the Simple Object Access Protocol (SOAP) or Representative State Transfer (REST), or Web APIs. In another embodiment, link 120 is an intranet connection, link 124 is an intranet connection, and link 126 is an applications programming interface (API), such as SOAP/REST or Web APIs.

The expense report system receives the receipt image data 116 via link 120 from the receipt image capture devices 102, 104, credit card data 114 from the credit card services 108 via link 124, and receipt data 118 from the receipt image processing services 110 via link 126. The receipt image processing services 110 receives the receipt image data 116 from the expense report system 106, optically recognizes the characters in the receipt image data 116, and extracts relevant receipt data 118 from the receipt image data 116. Once the expense report system 106 obtains the receipt data 118, the expense report system 106 associates the receipt data 118 and receipt image data 116 with respective credit card data 114 and creates expense data for an expense report 112.

Figure 2:
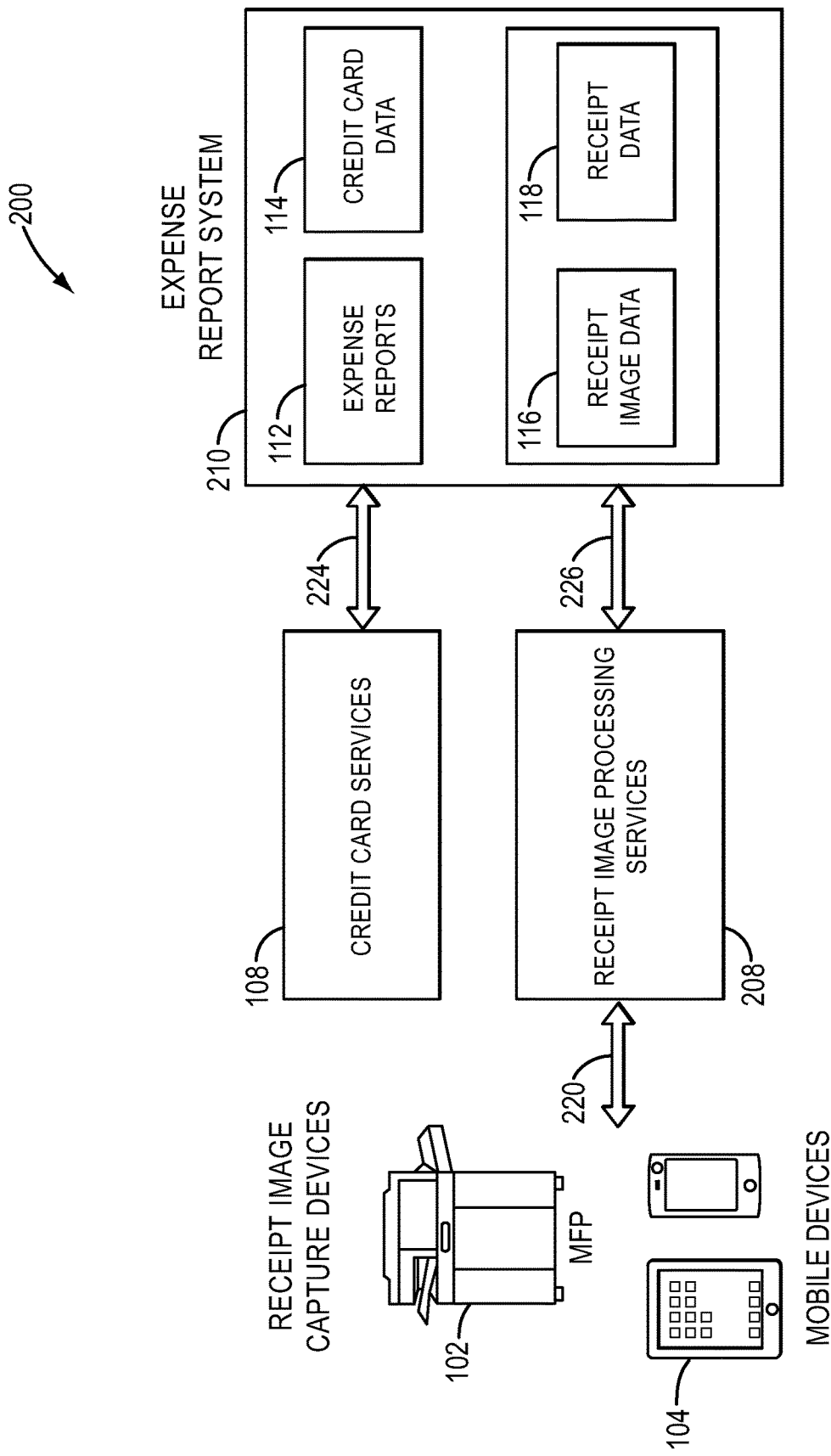
FIG. 2 depicts an overall system configuration according to another embodiment of the present invention.

FIG. 2 depicts an overall system configuration 200 according to another embodiment. The system configuration 200 of FIG. 2 includes receipt capture image devices such as MFP 102 and mobile devices 104, credit card services 108, receipt image processing services 208, expense report system 210. The expense report system 210 includes expense reports 112, credit card data 114, receipt image data 116, and receipt data 118. The expense report system 210 connects to receipt image processing services 208 via communications link 226 and to the credit card services 108 via communications link 224. The receipt image processing services 208 connects to the receipt image capture devices 102, 104 via communications link 220. In one embodiment, link 220 is an Internet connection, link 224 is an Internet connection, and link 226 is an API, such as SOAP/REST or Web APIs. In another embodiment, link 220 is an intranet/Internet connection, link 224 is an Internet connection, and link 226 is an API, such as SOAP/REST or Web APIs.

The expense report system 210 receives the receipt image data 116 from the receipt image processing services 208 via link 226, credit card data 114 from the credit card services 108 via link 224, and receipt data 118 from the receipt image processing services 208 via link 226. The receipt image processing services 208 receives the receipt image data 116 from the receipt image capture devices 102, 104 via link 220, optically recognizes the characters in the receipt image data 116, and extracts relevant receipt data 118 from the receipt image data 116. Once the expense report system 210 obtains the receipt data 118, the expense report system 210 associates the receipt data 118 and receipt image data 116 with respective credit card data 114 and creates expense data for an expense report 112.

Figure 3:
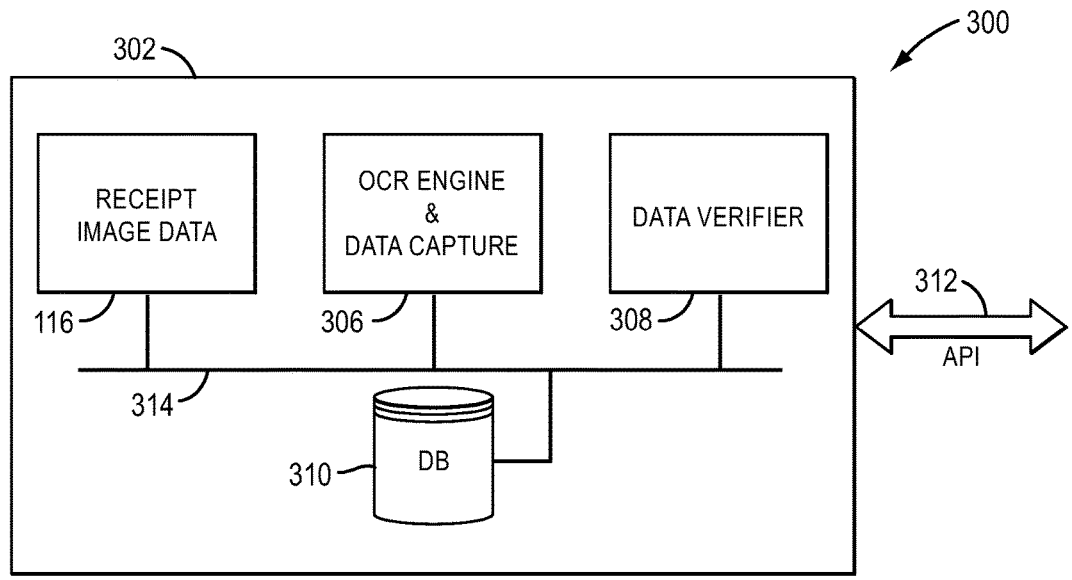
FIG. 3 depicts a high-level diagram of receipt image processing service.

FIG. 3 depicts an example implementation of receipt image processing services 208. The implementation includes receipt image data 116, an OCR Engine 306 with data capture capability, a data verifier 308, and an Application Programming Interface (API) 312. The receipt image data 116, the OCR Engine 306 with data capture, the data verifier, 308 and the database 310 are communicatively coupled, for example, via a bus 314. In one embodiment, bus 314 is a network connection.

The receipt image data 116 is stored in either persistent or non-persistent storage in a system hosting receipt image processing services 300. The OCR engine 306 is aided by a data verifier 308, which includes a user interface, to help increase the accuracy of the extracted receipt data. The database 310 stores the receipt data extracted from the receipt image data 116. The Application Programming Interface 312 provides a programming interface 312 for communicating with external systems such as the expense report system 210 in FIG. 2 or the image capture devices 102, 104, in FIG. 2.

Figure 4:
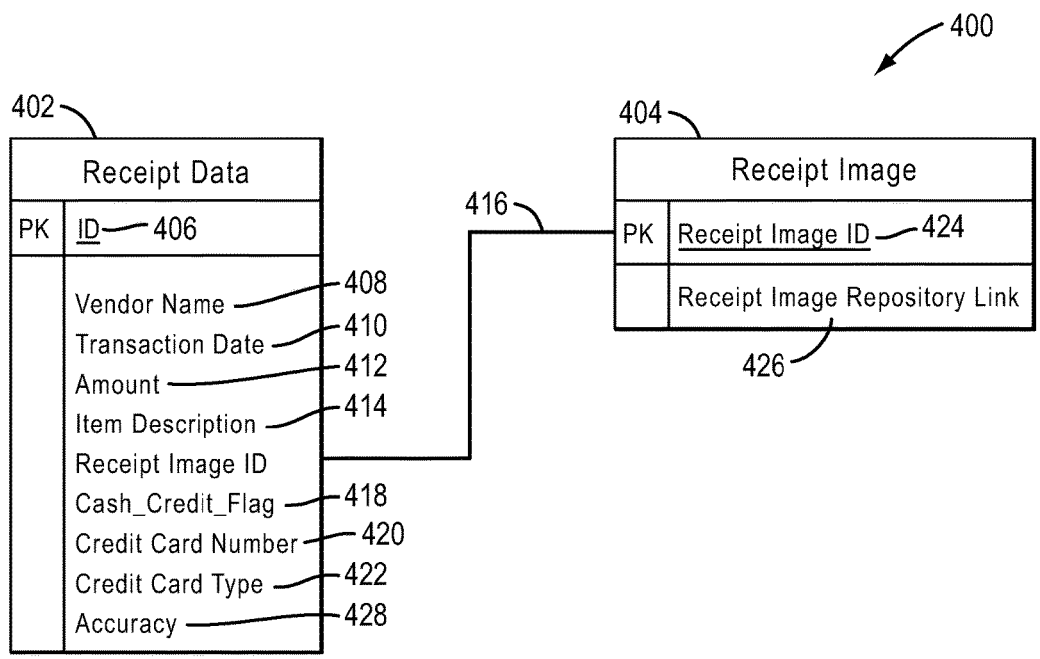
FIG. 4 depicts a high-level data model within the receipt processing system.

FIG. 4 depicts, in one embodiment, a high-level data model 400 within the system that provides receipt processing services 110 in FIG. 1. Other data models are possible and the invention is not limited to the particular data items depicted and described. The data items used may vary, depending on a particular implementation. The high-level data model 400 includes receipt data 402 and receipt image information 404. Receipt data 402 includes the following data items: vendor name or merchant name 408, transaction date 410, transaction amount 412, an item description 414, receipt image ID 416, a cash or credit/debit transaction flag 418, a credit/debit card number 420, a credit/debit card type 422, an accuracy or uncertainty parameter 428, and an ID 406, which is the primary key (PK) for the data items in the receipt data 402. Receipt image information 404 includes the following data items: a receipt image repository link 426 and a receipt image ID 424, which is the primary key for the receipt image information 404. The receipt image ID data item 416 contains receipt image ID 424 when the receipt image information 404 is associated with the receipt data 402. The receipt image ID 424 identifies the receipt image data (the electronic version of the receipt) that was obtained from the image capture devices 102, 104, in FIG. 1 or FIG. 2. The receipt image repository link 426 is a pointer to a storage area that contains the receipt image data 116. The combination of the receipt image ID 424 and the receipt image repository link 426 provides a unique identifier for the receipt image data in the repository.

Data items 408, 410, 412, 414, 418, 420, 422 are recognized by an OCR engine 306 in FIG. 3. According to one embodiment, one or more uncertainty parameters, such as parameter 428, are associated with one or more of these data items. An uncertainty parameter provides an indication of the expected accuracy of the OCR process with respect to one or more corresponding data items. Uncertainty parameters may be expressed in a wide variety of forms, depending upon a particular implementation. For example, an uncertainty parameter may be expressed as a numerical value between 0 and 1, where 0 represents the lowest level of uncertainty and a 1 represents the highest level of certainty. Uncertainty parameters may be generated and stored by receipt image processing services 300.

According to one embodiment, the uncertainty parameters are displayed on a graphical user interface to provide a visual indication to a user of the expected accuracy of the OCR process with respect to certain data items. For example, when the uncertainty parameter for a data item is below a threshold, the system depicts blank values in the user interfaces depicted in FIG. 10, thereby flagging a user as to the uncertainty of the data. In the data verification user interfaces 800, 900, 1000, 1100, 1200 depicted, a user has an option to correct the data value and area on the receipt image data and associate the area with respective data item of interest. When a user makes such a correction, the changes are fed back to the OCR engine 306 in FIG. 3 to improve accuracy when OCR engine 306 comes across similar receipt image data.

Figure 5:
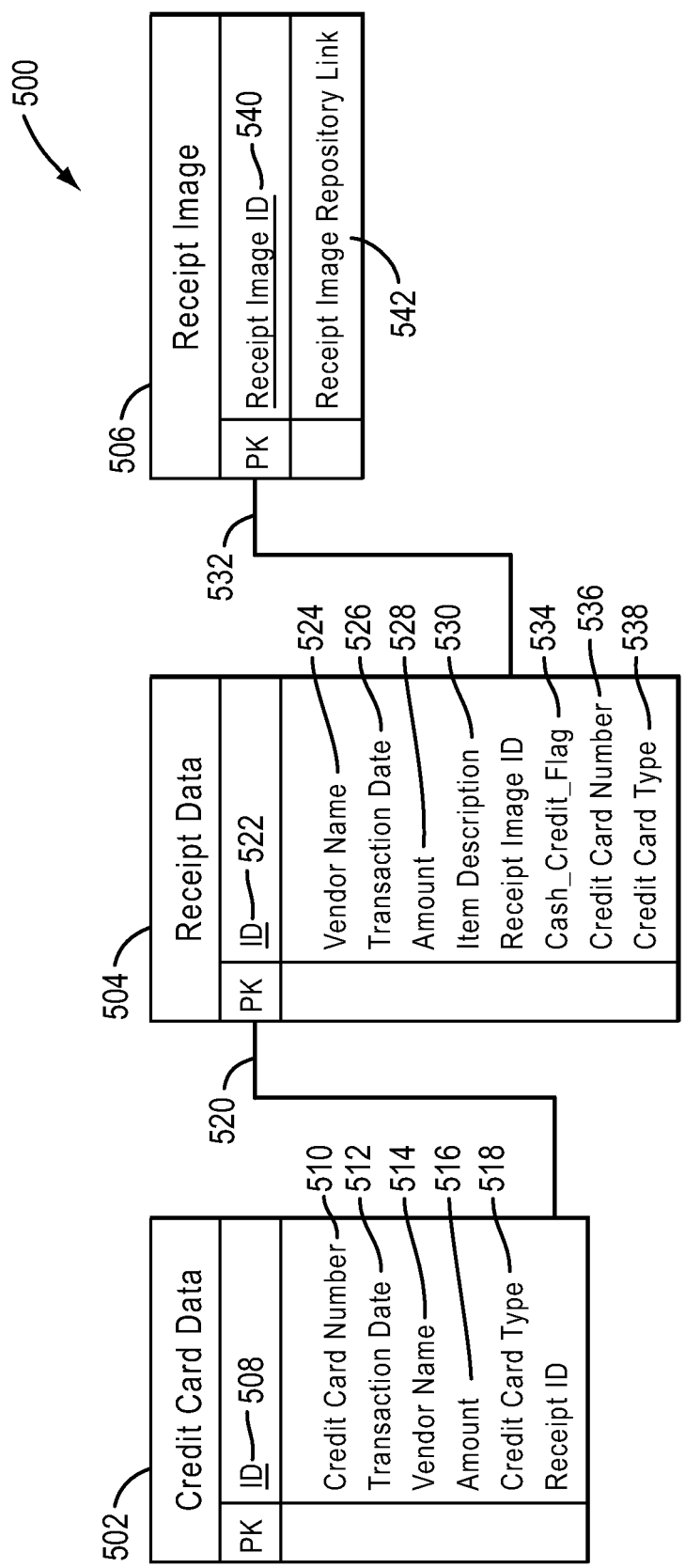
FIG. 5 depicts a high-level data model within the expense report system.

FIG. 5 depicts, in one embodiment of a high-level data model 500 within the expense report system 106, in FIG. 1 and 210 in FIG. 2. Other data models are possible and the invention is not limited to the particular data items depicted and described. The data items used may vary, depending on a particular implementation. The high-level data model 500 includes credit card data 502, receipt data 504 and receipt image information 506. Credit card data 502 includes the following data items: a credit/debit card number 510, transaction date 512, a vendor/merchant name 514, a transaction amount 516, a credit/debit card type 518, and a receipt ID 520, and ID 508, which is the primary key for the data items in credit card data 502. Receipt data 504 includes the following data items: vendor/merchant name 524, transaction date 526, transaction amount 528, item description 530, receipt image ID 532, cash-credit flag 534, credit/debit card number 536, credit/debit card type 538, and ID 522, which is the primary key for the data items in receipt data 504. Receipt image information 506 includes the following data items: a receipt image repository link 542, and receipt image ID 540, which is the primary key for the receipt image information 506. Receipt ID 520 contains data item ID 522 when the credit card data 502 is associated with receipt data 504. Receipt image ID 532 contains receipt image ID 540 when the receipt data 504 is associated with receipt image information 506. The receipt image repository link 542 is a pointer to a storage area that contains the receipt image data. The combination of the receipt image ID 540 and the receipt image repository link 542 provides a unique identifier for storing and retrieving the receipt image data in a repository, as database 310 in FIG. 3.

Figure 6:
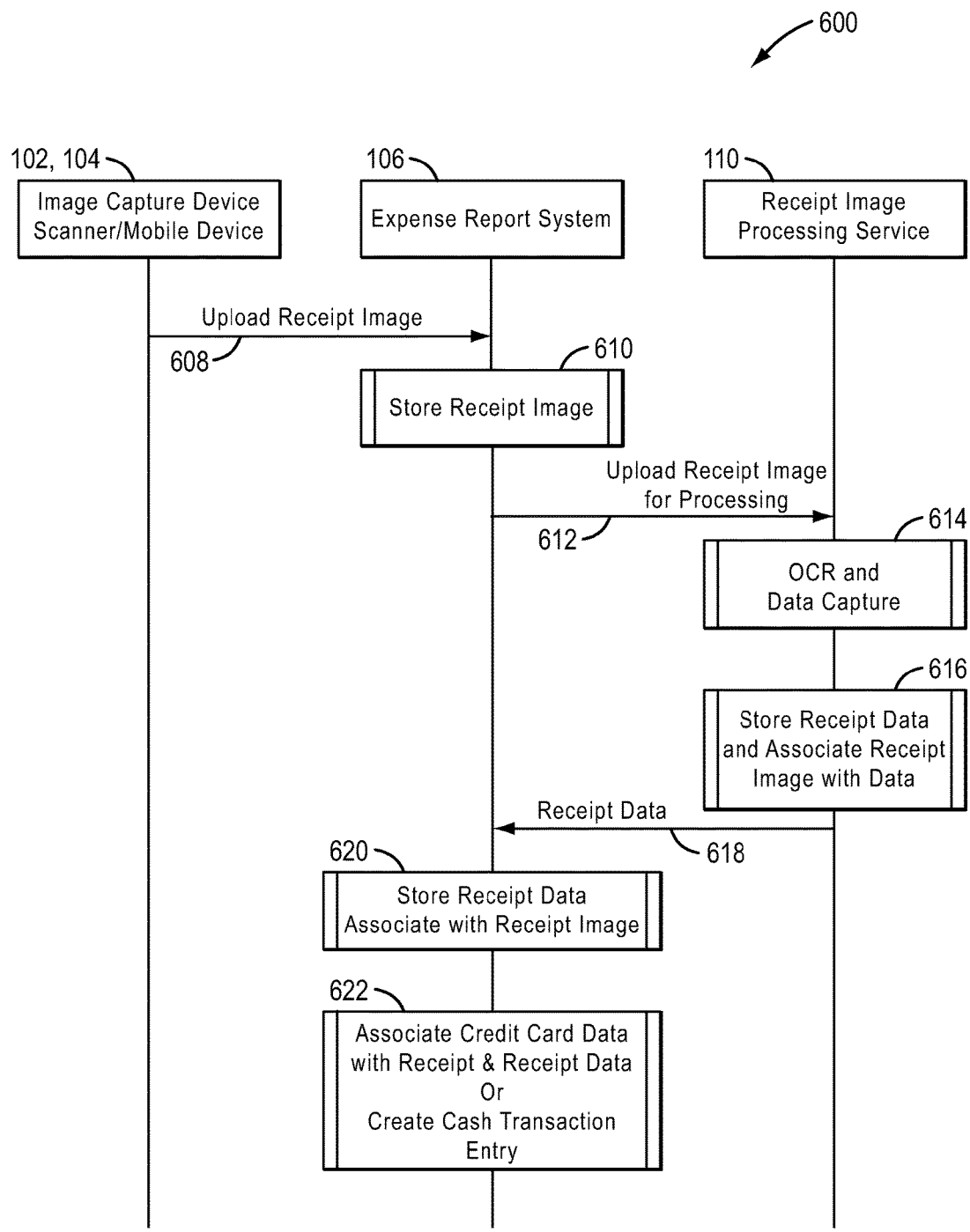
FIG. 6 depicts a data flow diagram with respect to the system of FIG. 1.

FIG. 6 depicts a data flow diagram with respect to the system depicted in FIG. 1. In the figure, data flows among the image capture devices 102, 104, the expense report system 106, and receipt image processing services 110. In step 608, the image capture devices 102, 104 send receipt image data 116 to the expense report system 106. In step 610, the expense report system 106 stores the receipt image data 116. In step 612, the expense report system 106 sends the uploaded receipt image data 116 to receipt image processing services 110. In step 614, receipt image processing services 110 performs optical character recognition and data capture on the receipt image data 116. In step 616, receipt image processing services 110 stores the receipt data 118 and associates the receipt image data 116 with the receipt data 118. In step 618, receipt image processing services 110 sends the receipt data 118 to the expense report system 106, which stores, in step 620, the receipt data 118 and associates the receipt image data 116 with the receipt data 118. In step 622, the expense report system 106 associates credit card data 114 with the receipt data 118 and the receipt image data 116 to create expense data for an expense report 112 or creates expense data for a cash transaction in an expense report 112. In one embodiment, in step 614, receipt image processing services 110 performs OCR with the help of a user who compares the receipt image data 116 with the receipt data 118 to determine whether the OCR engine 306 has correctly captured the receipt data 118 and whether all of the receipt data 118 is present. In one embodiment, a user trains the OCR engine 306 if the receipt data 118 is found to be missing a data item by supplying to the OCR engine 306 an appropriate area on the receipt image data 116 from which to extract a data item and an association that links the area with a data item in the receipt data 118.

Figure 7:
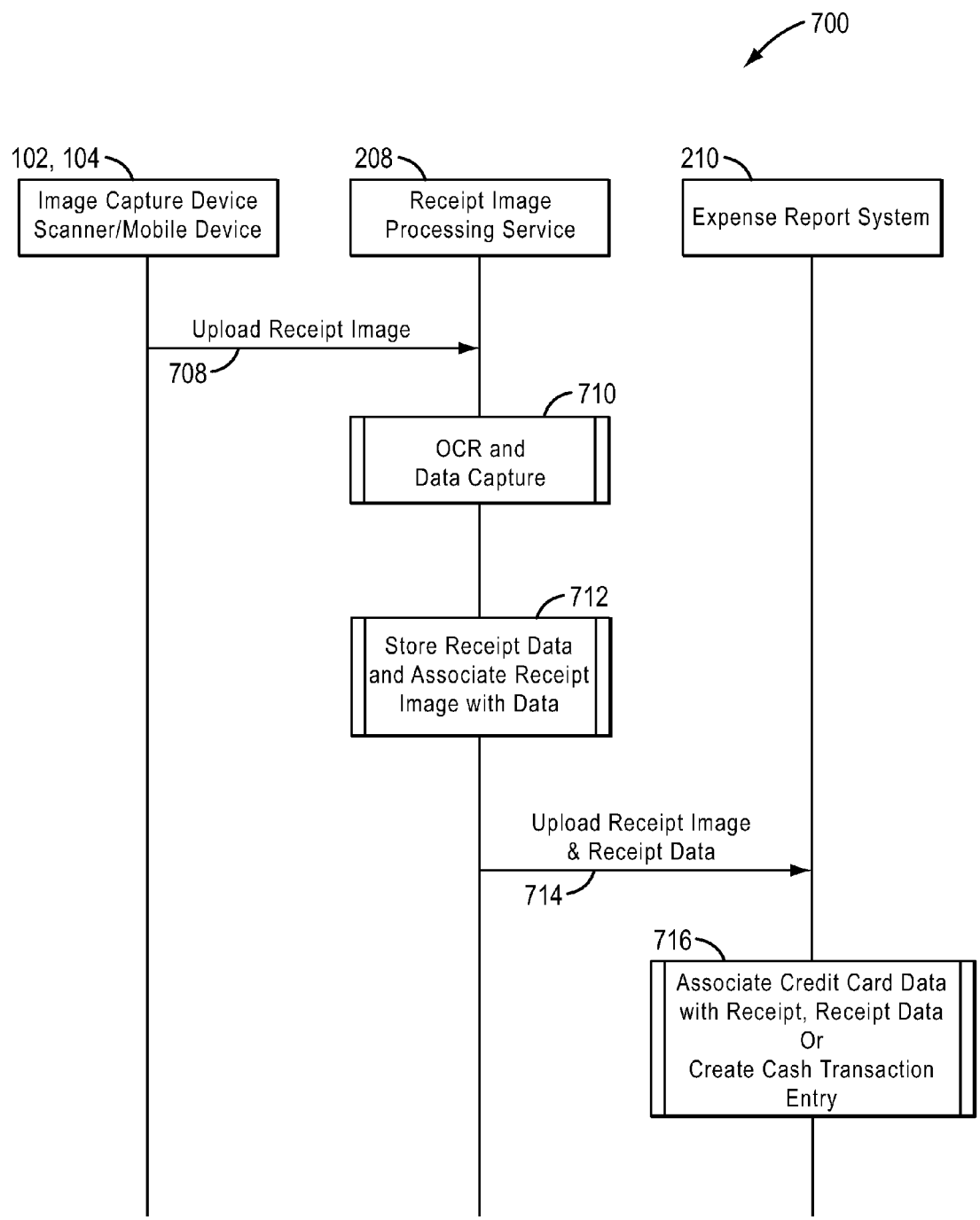
FIG. 7 depicts a data flow diagram with respect to the system of FIG. 2.

FIG. 7 depicts a data flow diagram with respect to the system depicted in FIG. 2. The data flows among the image capture devices 102, 104, receipt image processing services 208, and the expense report system 210. In step 708, the image capture devices 102, 104 send receipt image data 116 to receipt image processing services 208. In step 710, receipt image processing services 208 performs the OCR and data capture of the receipt image data 116. In step 712, receipt image processing services 208 stores the receipt data 118 and associates the receipt image data 116 with the receipt data 118. In step 714, receipt image processing services 208 sends the receipt image data 116 and receipt data 118 to the expense report system 210. In step 716, the expense report system 210 associates the credit card data 114 with the receipt data 118 and the receipt image data 116 to create expense data for an expense report 112 or creates expense data for a cash transaction in an expense report 112. Other details of receipt image processing services 208 are the same as those in FIG. 6.

Figure 8:
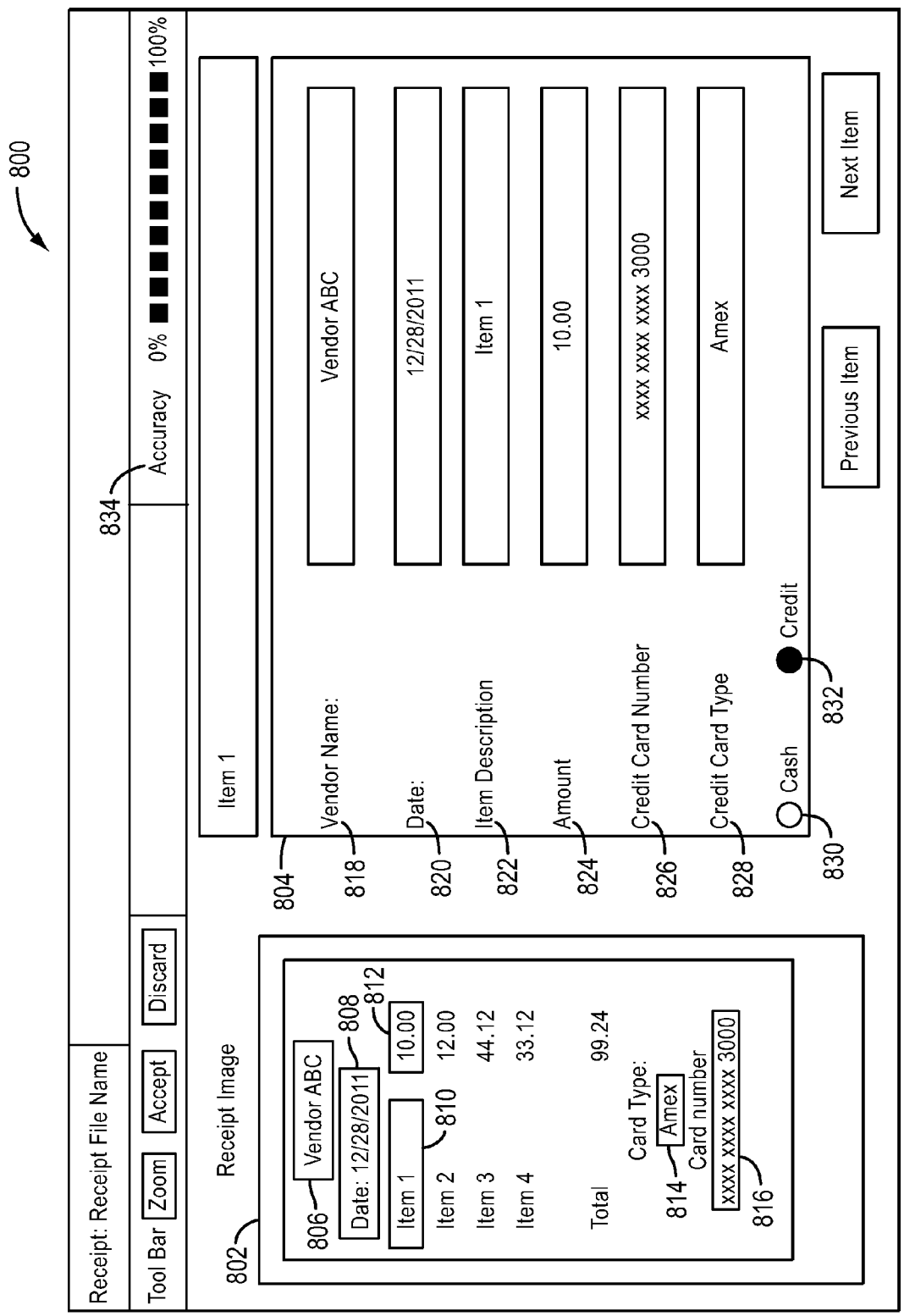
FIG. 8 depicts an example user interface of the data verification system.
Figure 9:
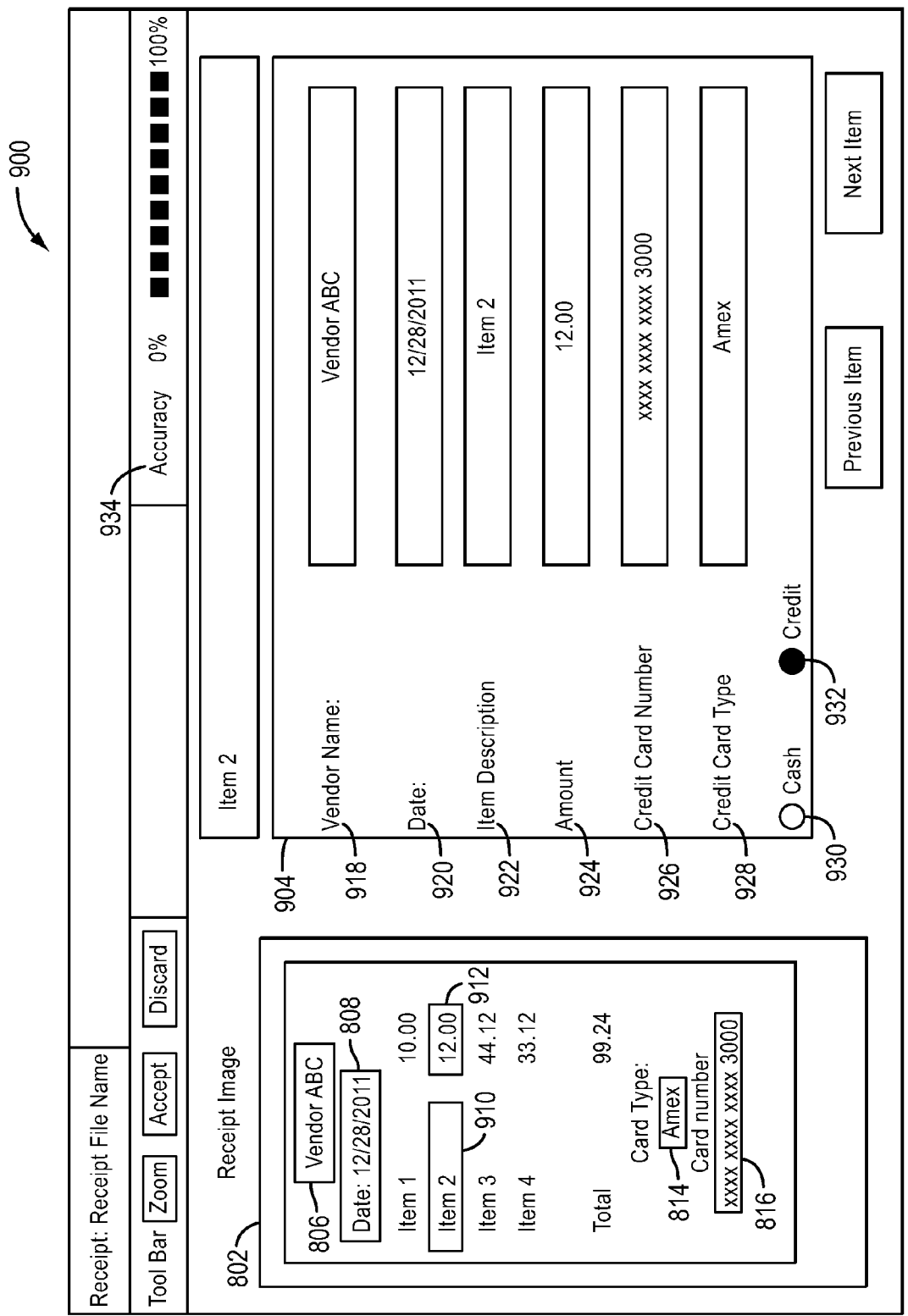
FIG. 9 depicts an example user interface of the data verification system.
Figure 10:
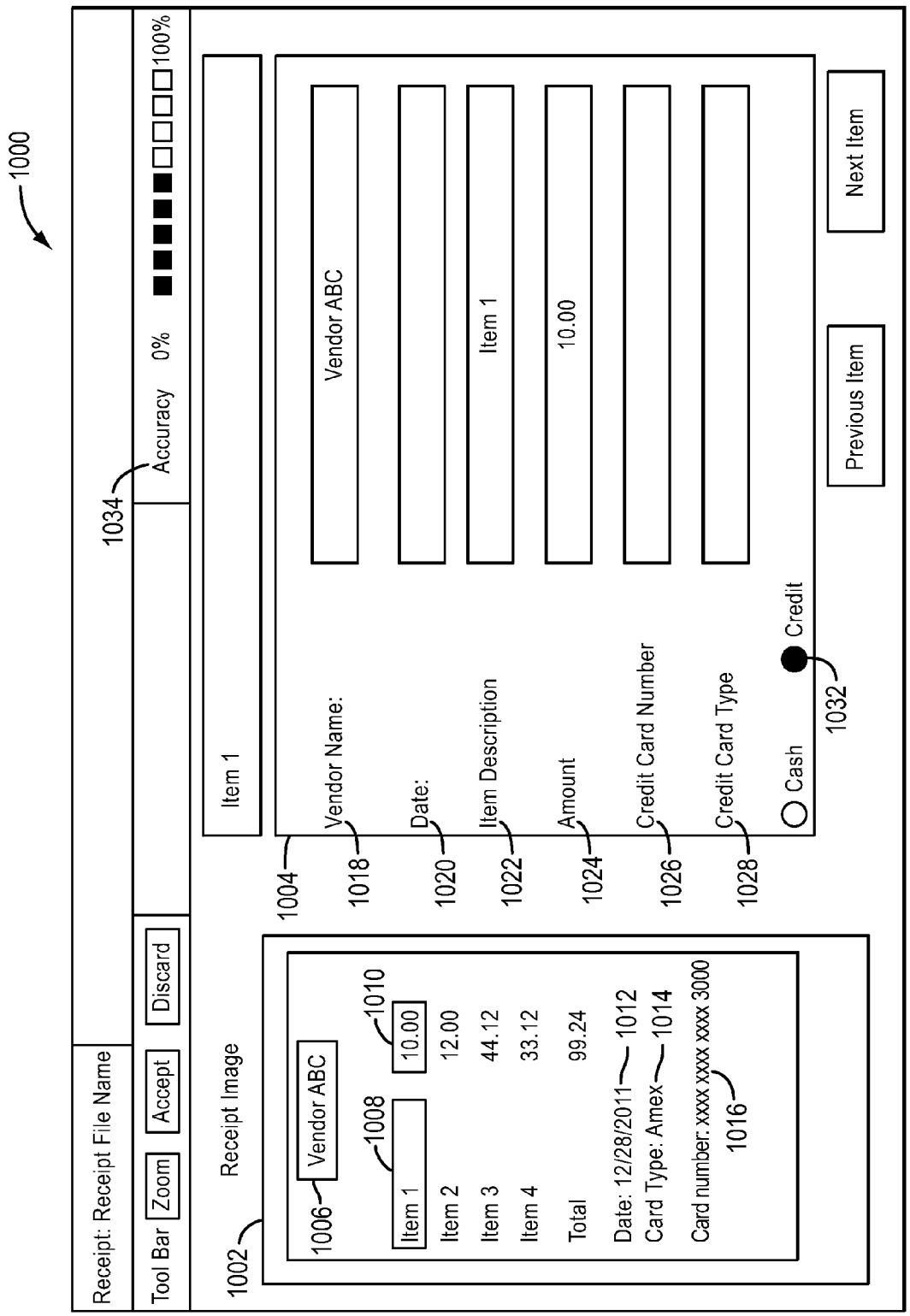
FIG. 10 depicts a case in which the OCR engine is unable to identify the data items correctly.
Figure 11:
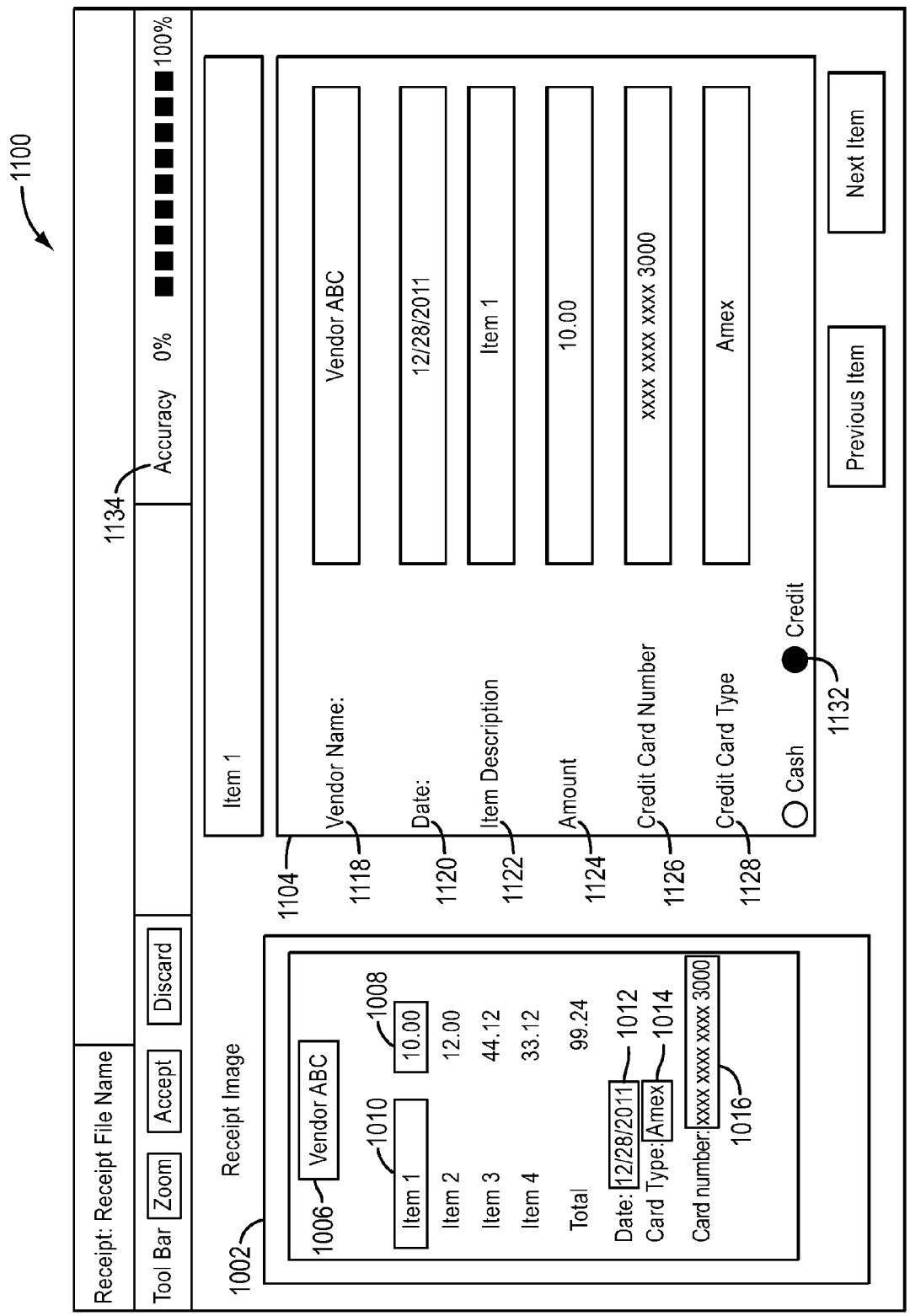
FIG. 11 depicts a user association of an image with data items to aid the OCR engine.
Figure 12:
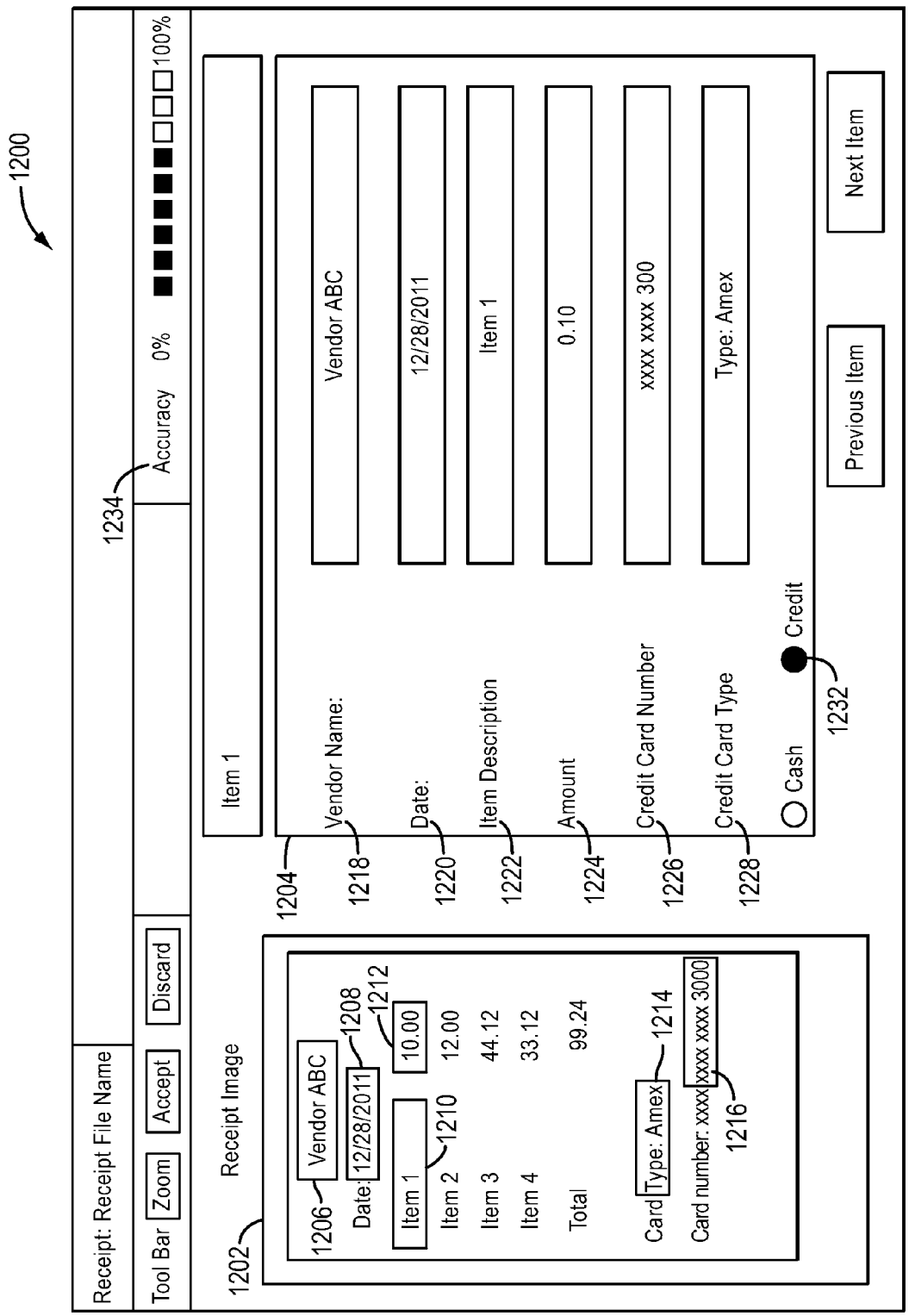
FIG. 12 depicts a case in which the OCR engine is unable to identify the data items accurately.
Figure 13:
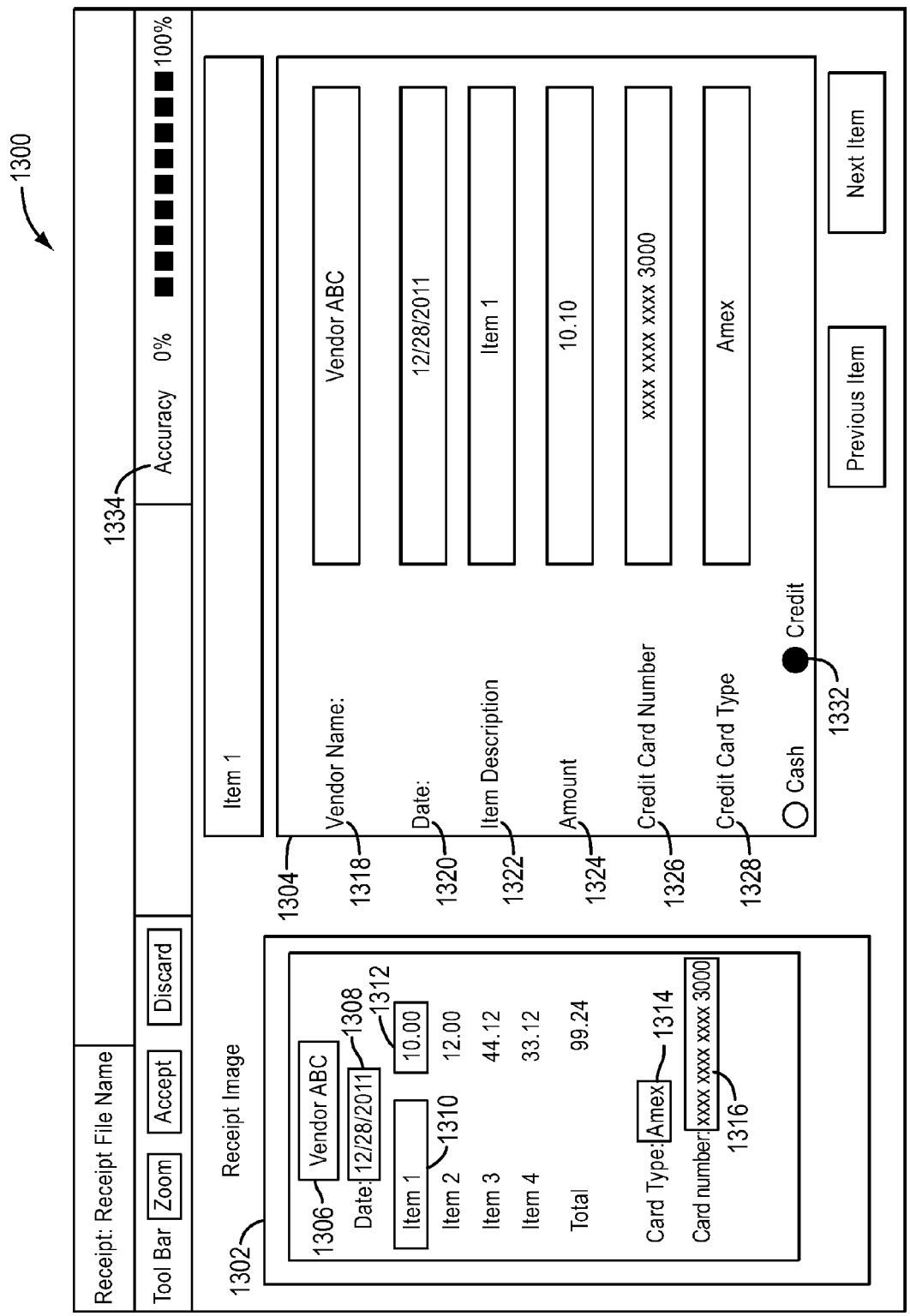
FIG. 13 depicts a user's correction for the errors depicted in FIG. 12.

FIGS. 8, 9, 10, 11, and 12 depict example user interfaces operable in conjunction with the data verifier 308 in FIG. 3. FIGS. 8 and 9 illustrate a receipt image and receipt data for items 1 and 2 on the receipt image, respectively. FIGS. 10 and 11 illustrate the case in which the OCR engine 306 in FIG. 3 fails to capture one or more data items and a user supplies the missing item or items. FIGS. 12 and 13 illustrate the case in which the OCR engine 306 captures one or more data items incorrectly and a user corrects the incorrect items.

The example user interface depicted in FIG. 8 includes data areas in the receipt image 802, and data items in the receipt data for a particular item, item 1, in the receipt image 802 when the data is correctly captured by the OCR engine 306. The data areas in the receipt image 802 include a vendor/merchant name 806, the transaction date 808, the item 1 description 810, the transaction amount 812, a credit/debit card type 814, and the credit/debit card number 816. The receipt data 804 for item 1 includes the vendor/merchant name 818, the transaction date 820, the item 1 description 822, the transaction amount 824, the credit/debit card number 826, and the credit/debit card type 828. Additionally, the receipt data 804 depicted includes a "cash" radio button 830 and a "credit" radio button 832, which for the case depicted is marked, because the item 1 transaction is a credit transaction. The figure illustrates that the OCR engine 306 identified the receipt data 804 for item 1 correctly and accurately because each data area in the receipt image 802 pertaining to item 1 has a corresponding data item in the receipt data 804 for item 1 that is correctly captured. Additionally, an accuracy scale 834 indicates to the user that the receipt data 802 is correct and accurate.

FIG. 9 depicts another example user interface. The user interface in FIG. 9 includes data areas in the receipt image 802, and data items in the receipt data 904 for item 2 in the receipt image 802 when the data is correctly captured by the OCR engine 306. The data areas in the receipt image 802 include a vendor/merchant name 806, the transaction date 808, the item 2 description 910, the transaction amount 912, a credit/debit card type 814, and the credit/debit card number 816. The data items in the receipt data 904 for item 2 include a vendor/merchant name 918, the transaction date 920, the item 2 description 922, the transaction amount 924, the credit/debit card number 926, and the credit/debit card type 928. Additionally, the receipt data 904 depicted has a "cash" radio button 930 and a "credit" radio button 932, which is marked, because the item 2 transaction is a credit transaction. The figure illustrates that the OCR engine 306 identified the receipt data 904 for item 2 correctly and accurately because each data area in the receipt image 802 pertaining to item 2 has a corresponding data item in the receipt data 904 for item 2 that is correctly captured. Additionally, accuracy scale 934 indicates that the receipt data 904 is correct and accurate.

The user interfaces depicted in FIG. 10 and FIG. 11 illustrate how a user can improve the ability of the OCR engine 306 to capture data from receipt image data.

FIG. 10 depicts a case in which the OCR engine 306 is unable to identify the data items for item 1 correctly. In the case illustrated, the receipt image 1002 data areas include a vendor/merchant name 1006, the item 1 description 1008, the transaction amount 1010, the transaction date 1012, a credit/debit card type 1014, and the credit/debit card number 1016. The receipt image 1002 depicted in FIG. 10 is different from the receipt image 802, 902 respectively depicted in FIGS. 8 and 9 in that the transaction date 1012 area has a new location on the receipt image 1002. The transaction date area 1012 is now located near the credit/debit card type 1014 data area, instead of near the vender/merchant name data area 1006. The receipt data 1004 data items for item 1 include the vendor/merchant name 1018, the transaction date 1020, the item 1 description 1022, the transaction amount 1024, the credit/debit card number 1026, and the credit/debit card type 1028. The credit radio button 1032 is set. However, in the figure, the OCR engine 306 has left the transaction date 1020, the credit card number 1026, and the credit/debit card type 1028 data items blank, because uncertainty parameters for the blank data items are below a given threshold. In this embodiment, the OCR engine 306 has thus illustrated the uncertainty parameters by leaving the transaction date 1020, the credit/debit card number 1026, and the credit/debit card type 1028 data items blank. Additionally, an accuracy scale 1034 indicates that the receipt data 1004 accuracy is below 100%.

FIG. 11 depicts the case in which a user provides missing data items to the data verifier. In FIG. 11, receipt image 1002 data areas include vendor/merchant name 1006, the item 1 description 1010, the transaction amount 1008, the transaction date 1012, the credit/debit card type 1014, and the credit/debit card number 1016. The data items for item 1 in the receipt data 1104 include the vendor/merchant name 1118, the transaction date 1120, the item 1 description 1122, the transaction amount 1124, the credit/debit card number 1126, and the credit/debit card type 1128. The credit radio button 1132 is set. In the figure, a user has filled in the transaction date 1120, the credit/debit card number 1126, and the credit/debit card type 1128, thereby raising the accuracy indicator 1134 to 100%. The user has also outlined or otherwise marked the data areas for the transaction date 1012, for the credit/debit card type 1014, and for the credit/debit card number 1016, so that the OCR engine 306 can better process this type of receipt image 1002 the next time it processes such a type. In one embodiment, a user outlines the un-captured data areas with colored boundaries that correlate with colored boundaries around the corresponding data items in the receipt data. For example, a user outlines: the data area for the transaction date 1012 on the receipt image 1002 with a blue rectangle, which corresponds with a blue rectangle surrounding the transaction date 1120 in the receipt data 1104; the data area for the credit/debit card type 1014 on the receipt image 1002 with a green rectangle, which corresponds with a green rectangle surrounding the credit/debit card type 1128 in the receipt data 1104; and the data area for the credit/debit card number 1016 on the receipt image 1002 with a brown rectangle, which corresponds with a brown rectangle surrounding the credit/debit card number 1126 in the receipt data 1104. Other markings that correlate the data areas in the receipt image 1002 with the data items in the receipt data 1104 can be used.

Sometimes the OCR engine captures a data area on the receipt image, but does so inaccurately. The data item in the receipt data is not blank but the data in the data item is not accurate according to the receipt image. FIGS. 12 and 13 illustrate this case.

In FIG. 12, some of the data items in the receipt data 1204 do not match the corresponding data areas in the receipt image 1202. In the figure, data areas of the receipt image 1202 include vendor/merchant name 1206, the transaction date 1208, the item description 1210, the transaction amount 1212, the credit/debit card type 1214, and the credit/debit card number 1216. The data items of the receipt data 1204 include the vendor/merchant name 1218, the transaction date 1220, the item description 1222, the transaction amount 1224, the credit/debit card number 1226, and the credit/debit card type 1228. The credit radio button 1232 is marked. However, while the other captured data items in the receipt data 1204 for item 1 match the data areas in the receipt image for item 1, the transaction amount 1212 on the receipt image 1202 does not match the captured transaction amount 1224 in the receipt data 1204 and the credit/debit card number 1216 on the receipt image 1202 does not match the captured credit/debit card number 1226 in the receipt data 1204. Additionally, an accuracy scale 1234 indicates that the receipt data 1204 accuracy is less than 100%.

In FIG. 13, a user corrects the inaccurate data items in the receipt depicted in FIG. 12. In the figure, the data areas in receipt image 1302 include the vendor/merchant name 1306, the transaction date 1308, the item description 1310, the transaction amount 1312, the credit/debit card type 1314, and the credit/debit card number 1316. The data items in the receipt data 1304 include the vendor/merchant name 1318, the transaction data 1320, the item description 1322, the transaction amount 1324, the credit/debit card number 1326, and the credit/debit card type 1328. The credit radio button 1332 is marked. In the figure, a user has corrected the transaction amount 1324 and the credit/debit card number 1326 to match the data for those items in the receipt image 1302, thereby raising the accuracy indicator 1334 to 100%. The corrected transaction amount 1324 and credit/debit card number 1326 are supplied to the OCR engine 306 to improve its accuracy. Additionally, data areas 1312, 1316 for those items are delineated to further aid the OCR engine 306.

Figure 14:
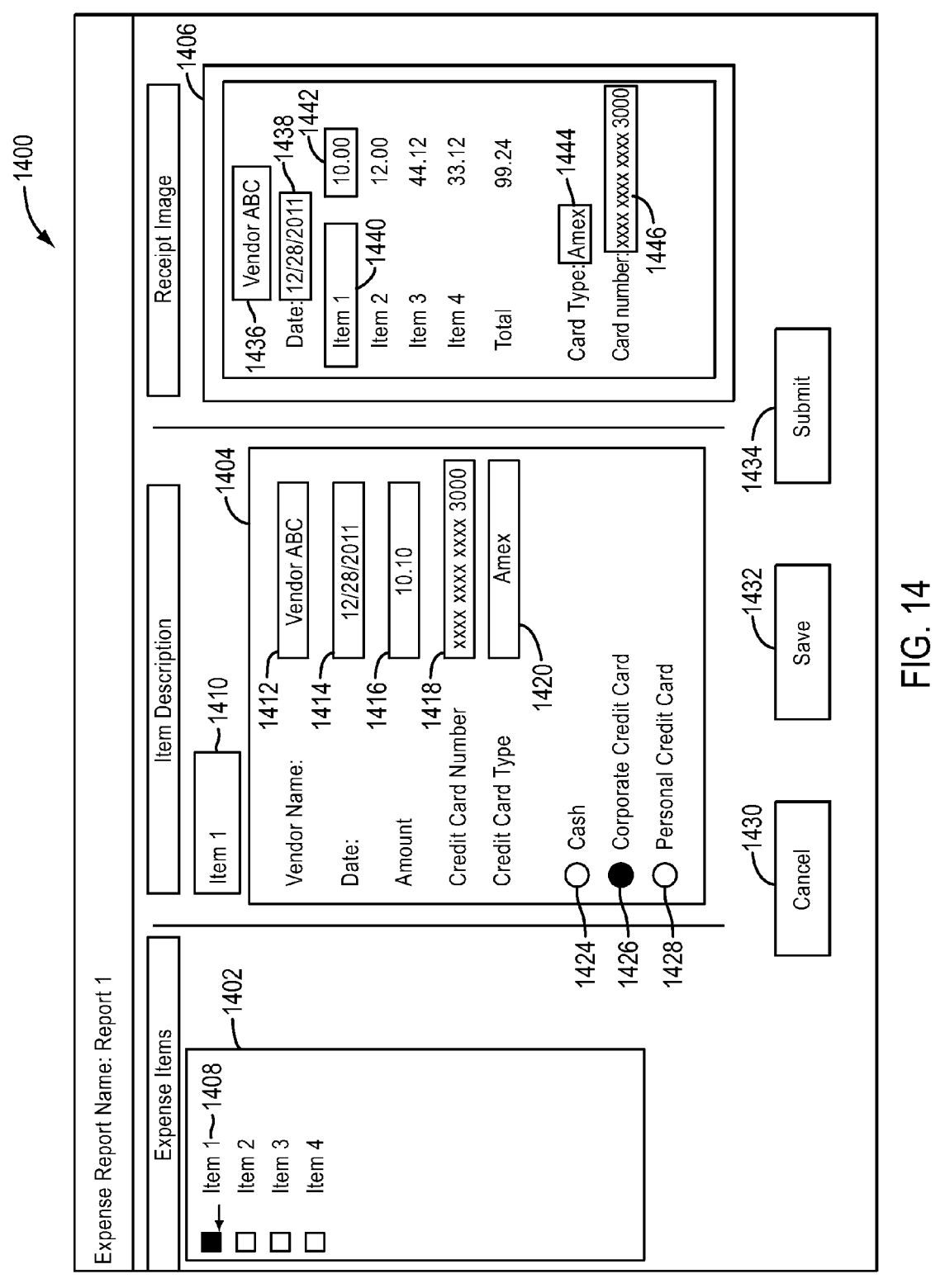

FIG. 14 depicts, in one embodiment, expense data 1400 for an expense report. The expense data includes expense item list 1402, a receipt data 1404 for an item, and a receipt image 1406. The expense item list 1402 includes one or more selectable expense items, item 1 1408 of which is selected. The data items in the receipt data 1404 for item 1 1408 include a vendor/merchant name 1412, the transaction date 1414, the transaction amount 1416, a credit/debit card number 1418, and the credit/debit card type 1420. The receipt image 1406 includes data areas that contain the vendor/merchant name 1436, the transaction date 1438, the item description 1440, the transaction amount 1442, the credit/debit card type 1444, and the credit/debit card number 1446. A marked button 1426 in the receipt data 1404 indicates that item 1 1410 is a corporate credit card transaction, rather than a cash transaction 1424 or a personal credit card transaction 1428. The expense data 1400 further includes a cancel button 1430, a save button 1432, and a submit button 1434. The cancel button 1430, when activated, prevents the expense data from being included in an expense report; the save button 1432, when activated, saves the expense data for later action, either a cancellation or a submission. The submit button 1434, when activated, assures that the expense data 1400 is part of an expense report.

Figure 15:
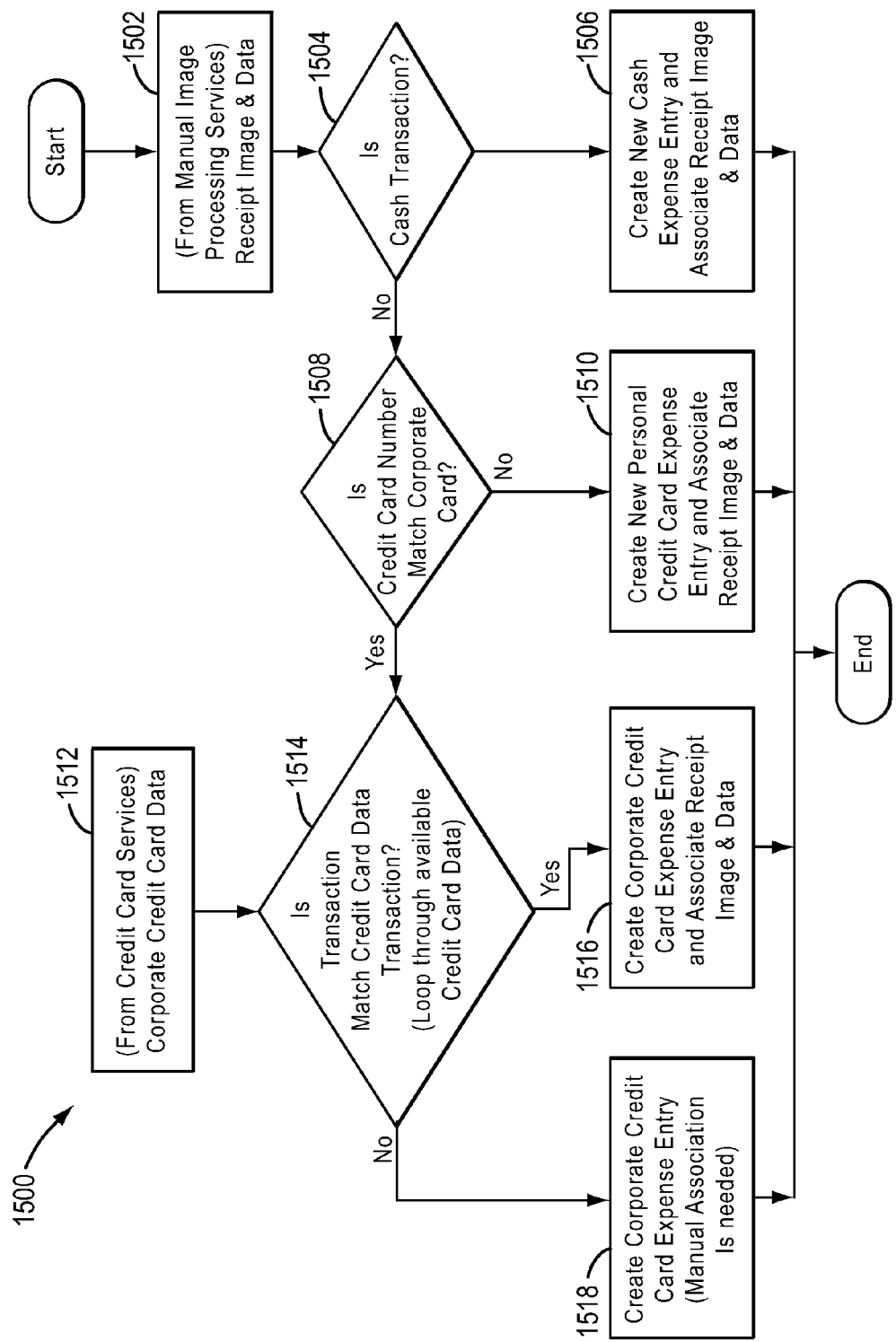
FIG. 15 depicts a flow, in one embodiment, of data extracted from receipts.

FIG. 15 depicts a flow, in one embodiment, of how the receipt data is associated with credit card transaction data and expense data is created in the expense management system. In step 1502, receipt image processing services 110, 208 provides the receipt image data 116 and the receipt data 118. In step 1504, the system checks the receipt image data 116 and receipt data 118 to determine whether the transaction is a cash transaction. If so, the system creates cash expense data and associates the cash expense data with the receipt image data 116 and receipt data 118 in step 1506. If the transaction is a credit transaction, as determined in step 1504, the system determines, in step 1508, whether the credit/debit card number on the receipt data 118 matches a corporate card number. If there is no match, as determined in step 1508, then the system creates new expense data for personal credit card transaction and associates the new expense data with receipt image data 116 and receipt data 118 in step 1510. If the credit/debit card number in the transaction is a corporate credit/debit card number, as determined in step 1508, then, in step 1514, the system compares the credit/debit card number with the credit card data 1512 available from corporate credit card services 108. If there is a match, as determined in step 1514, the system creates expense data for a corporate credit card transaction and associates the expense data with the receipt image data 116 and receipt data 118 in step 1516. If there is no match found between the corporate credit card data and the receipt data 118, as determined in step 1514, the system creates expense data with receipt image data 116 and receipt data 118, and a user manually associates, in step 1518, this expense data with credit card data and the receipt image data 116 and receipt data 118.

Figure 16:
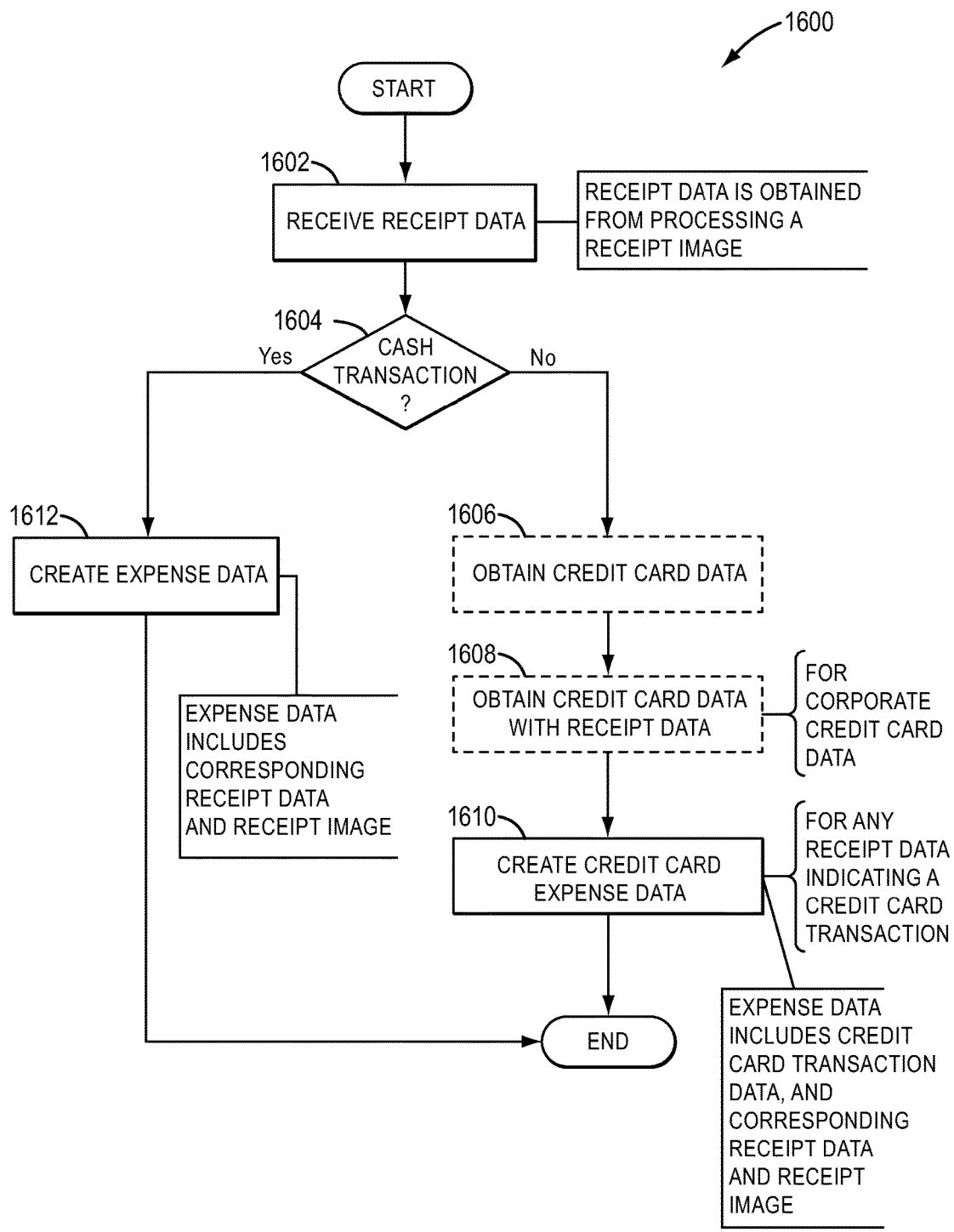
FIG. 16 depicts a flow in accordance with an embodiment.

FIG. 16 depicts a flow chart for an embodiment of the present invention. In step 1602, the system receives receipt data 118 from receipt processing services 110. If the receipt data 118 indicates a credit transaction, as determined in step 1604, then, in optional step 1606, the system obtains credit card data. In optional step 1608, the system matches the credit card data with the receipt data 118, when the credit card data is corporate credit card data. In step 1610, the system creates credit card expense data for any receipt data 118 indicating a credit transaction, where the expense data includes credit card transaction data, and corresponding receipt data 118 and receipt image data 116. If the receipt data 118 indicates a cash transaction, then, in step 1612, the system creates expense data, where the expense data includes the corresponding receipt data 118 and receipt image data 116.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
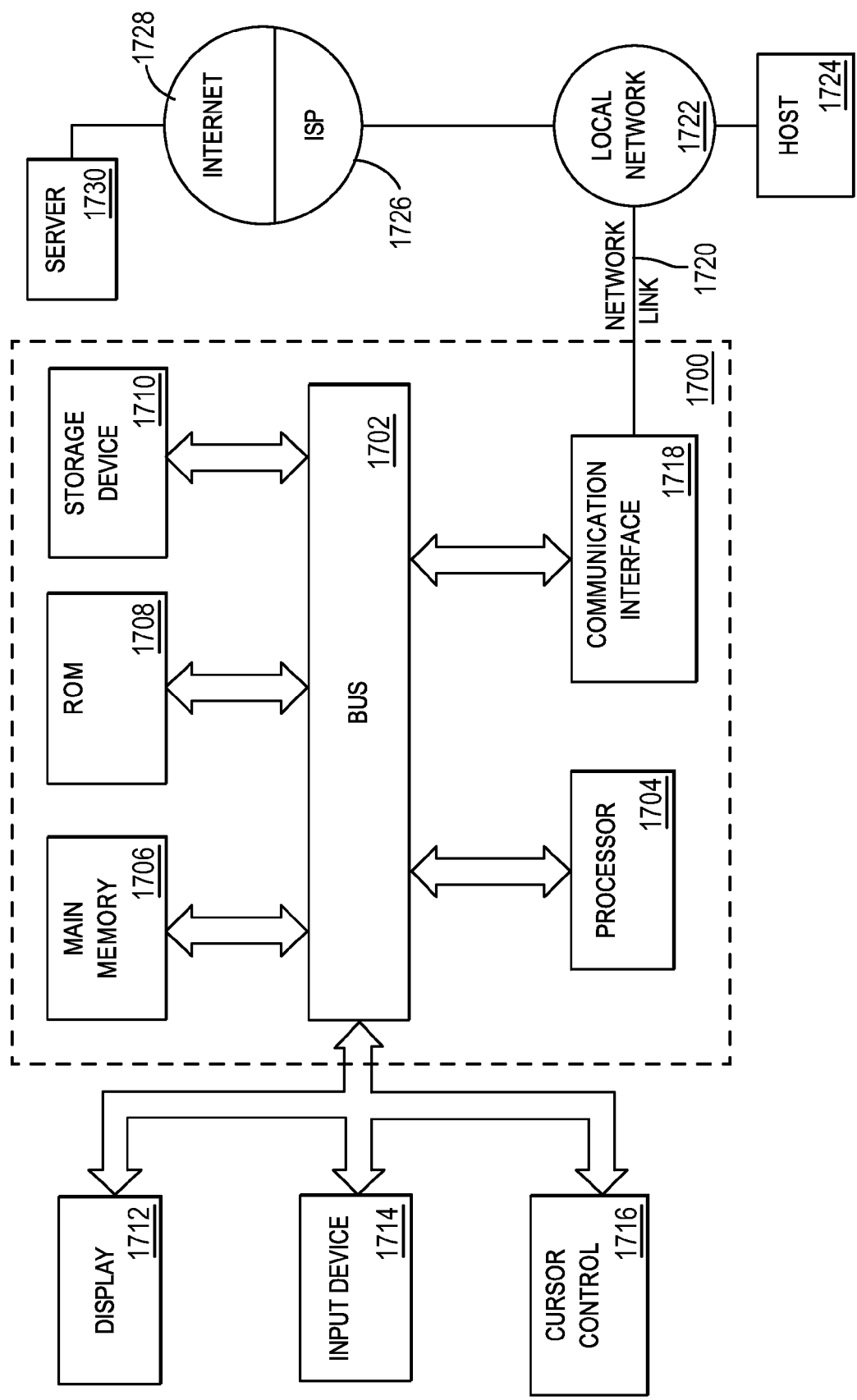
FIG. 17 is a block diagram that illustrates a computer system upon which an embodiment of the invention may be implemented.

For example, FIG. 17 is a block diagram that illustrates a computer system 1700 upon which an embodiment of the invention may be implemented. Computer system 1700 includes a bus 1702 or other communication mechanism for communicating information, and a hardware processor 1704 coupled with bus 1702 for processing information. Hardware processor 1704 may be, for example, a general-purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, convert computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1710. Volatile media includes dynamic memory, such as main memory 1706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1026, local network 1722 and communication interface 1718.

The received code may be executed by processor 1704 as it is received, and/or stored in storage device 1710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when processed by one or more processors, cause:

receiving, from an image capture device, receipt image data for a receipt for a transaction;

processing the receipt image data by an optical character recognition (OCR) engine to extract receipt data that includes a plurality of transaction attribute values for a plurality of respective transaction attributes pertaining to the transaction;

assigning, by the OCR engine, an uncertainty parameter value that indicates an expected accuracy of optical character recognition by the OCR engine for each respective transaction attribute value of the plurality of transaction attribute values;

wherein the uncertainty parameter value for at least one transaction attribute value of the plurality of transaction attribute values does not satisfy a threshold;

displaying, concurrently on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold;

for the at least one transaction attribute of the one or more transaction attributes that has a corresponding transaction attribute value with an uncertainty parameter value that does not satisfy a threshold, receiving, through the graphical user interface, user input specifying a corrected transaction attribute value;

defining a first area on a receipt image represented by the receipt image data that is associated with the corrected transaction attribute value, the defined first area aiding in the optical recognition of the characters in the receipt image corresponding to the corrected transaction attribute value;

generating an expense report that includes the receipt image data and the corrected transaction attribute value.

2. The one or more non-transitory computer-readable media recited in claim 1, wherein the instructions further cause retrieving corporate credit card transaction data from a credit card service; wherein the corporate credit card transaction data is included in the expense report.

3. The one or more non-transitory computer-readable media recited in claim 1, wherein instructions for concurrently displaying, on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold comprise instructions for:
- determining that a transaction attribute value in the receipt data is missing for a corresponding transaction attribute;
- in response to determining that the transaction attribute value in the receipt data is missing for the corresponding transaction attribute, displaying, via the graphical user interface, a field for adding the missing transaction attribute value to the receipt data.

4. The one or more non-transitory computer-readable media recited in claim 3, further comprising additional instructions which, when processed by the one or more processors cause defining a second area on the receipt image that is associated with the missing transaction attribute value, the defined second area aiding in the optical recognition of the characters in the receipt image corresponding to the missing transaction attribute value.

5. The one or more non-transitory computer-readable media recited in claim 1, wherein instructions for concurrently displaying, on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold comprise instructions for displaying a blank value for the at least one transaction attribute value of the plurality of transaction attribute values that does not satisfy the threshold.

6. An apparatus comprising:
- one or more processors; and
- one or more memories storing instructions which, when processed by the one or more processors, cause:
  - receiving, from an image capture device, receipt image data for a receipt for a transaction;
  - processing the receipt image data by an optical character recognition (OCR) engine to extract receipt data that includes a plurality of transaction attribute values for a plurality of respective transaction attributes pertaining to the transaction;
  - assigning, by the OCR engine, an uncertainty parameter value that indicates an expected accuracy of optical character recognition by the OCR engine for each respective transaction attribute value of the plurality of transaction attribute values;
  - wherein the uncertainty parameter value for at least one transaction attribute value of the plurality of transaction attribute values does not satisfy a threshold;
  - displaying, concurrently on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold;
  - for the at least one transaction attribute of the one or more transaction attributes that has a corresponding transaction attribute value with an uncertainty parameter value that does not satisfy a threshold, receiving, through the graphical user interface, user input specifying a corrected transaction attribute value;
  - defining a first area on a receipt image represented by the receipt image data that is associated with the corrected transaction attribute value, the defined first area aiding in the optical recognition of the characters in the receipt image corresponding to the corrected transaction attribute value;
  - generating an expense report that includes the receipt image data and the corrected transaction attribute value.

7. The apparatus as recited in claim 6, wherein the instructions further cause retrieving corporate credit card transaction data from a credit card service; wherein the corporate credit card transaction data is included in the expense report.

8. The apparatus as recited in claim 6, wherein instructions for displaying, on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold comprise instructions for:
- determining that a transaction attribute value in the receipt data is missing for a corresponding transaction attribute;
- in response to determining that the transaction attribute value in the receipt data is missing for the corresponding transaction attribute, displaying, via the graphical user interface, a field for adding the missing transaction attribute value to the receipt data.

9. The apparatus as recited in claim 8, wherein the one or more memories store additional instructions which, when processed by the one or more processors cause defining a second area on the receipt image that is associated with the missing transaction attribute value, the defined second area aiding in the optical recognition of the characters in the receipt image corresponding to the missing transaction attribute value.

10. The apparatus as recited in claim 6, wherein instructions for displaying, on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold comprise instructions for displaying a blank value for the at least one transaction attribute value of the plurality of transaction attribute values that does not satisfy the threshold.

11. A computer-implemented method comprising:
- receiving, from an image capture device, receipt image data for a receipt for a transaction;
- processing the receipt image data by an optical character recognition (OCR) engine to extract receipt data that includes a plurality of transaction attribute values for a plurality of respective transaction attributes pertaining to the transaction;
- assigning, by the OCR engine, an uncertainty parameter value that indicates an expected accuracy of optical character recognition by the OCR engine for each respective transaction attribute value of the plurality of transaction attribute values;
- wherein the uncertainty parameter value for at least one transaction attribute value of the plurality of transaction attribute values does not satisfy a threshold;
- displaying, concurrently on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold;

for the at least one transaction attribute of the one or more transaction attributes that has a corresponding transaction attribute value with an uncertainty parameter value that does not satisfy a threshold, receiving, through the graphical user interface, user input specifying a corrected transaction attribute value;

defining a first area on a receipt image represented by the receipt image data that is associated with the corrected transaction attribute value, the defined first area aiding in the optical recognition of the characters in the receipt image corresponding to the corrected transaction attribute value;

generating an expense report that includes the receipt image data and the corrected transaction attribute value.

12. The computer-implemented method as recited in claim 11, further comprising retrieving corporate credit card transaction data from a credit card service; wherein the corporate credit card transaction data is included in the expense report.

13. The computer-implemented method as recited in claim 11, wherein displaying, on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold comprises:

determining that a transaction attribute value in the receipt data is missing for a corresponding transaction attribute;

in response to determining that the transaction attribute value in the receipt data is missing for the corresponding transaction attribute, displaying, via the graphical user interface, a field for adding the missing transaction attribute value to the receipt data.

14. The computer-implemented method as recited in claim 13, further comprising defining a second area on a receipt image represented by the receipt image data that is associated with the corrected transaction attribute value, the defined second area aiding in the optical recognition of the characters in the receipt image corresponding to the corrected transaction attribute value.

15. The computer-implemented method as recited in claim 11, wherein displaying, on a graphical user interface, the receipt image data, the plurality of transaction attributes pertaining to the transaction that were extracted from the receipt image data, and, a visual indicator that flags a user that the uncertainty parameter value of the at least one transaction attribute value of the plurality of transaction attribute values does not satisfy the threshold comprises displaying a blank value for the at least one transaction attribute value of the plurality of transaction attribute values that does not satisfy the threshold.

* * * * *